United States Patent
Pilcher et al.

(10) Patent No.: US 8,469,909 B2
(45) Date of Patent: Jun. 25, 2013

(54) MOTOR FOR A PERSONAL SKIN CARE APPLIANCE

(75) Inventors: Kenneth A Pilcher, Seattle, WA (US); Richard A Reishus, Renton, WA (US); Robert E Akridge, Seattle, WA (US)

(73) Assignee: L'Oreal, SA (FR)

( * ) Notice: Subject to any disclaimer, the term of this patent is extended or adjusted under 35 U.S.C. 154(b) by 948 days.

(21) Appl. No.: 12/475,364

(22) Filed: May 29, 2009

(65) Prior Publication Data

US 2010/0300480 A1 Dec. 2, 2010

(51) Int. Cl.
*A61H 1/00* (2006.01)

(52) U.S. Cl.
USPC .............. 601/80; 601/84; 601/134; 310/36

(58) Field of Classification Search
USPC .......... 601/15, 17–18, 46, 61, 66–67, 69–70, 601/78, 80, 84, 89, 93–95, 97, 107–108, 601/134–138; 310/15, 16–39
See application file for complete search history.

(56) References Cited

U.S. PATENT DOCUMENTS

| 2005/0274568 A1* | 12/2005 | Falco et al. ................ 181/135 |
| 2005/0280319 A1* | 12/2005 | Pilcher et al. ................ 310/36 |
| 2008/0097355 A1* | 4/2008 | Pilcher et al. ............ 604/289 |
| 2008/0106156 A1* | 5/2008 | Reishus et al. ............ 310/36 |

* cited by examiner

*Primary Examiner* — Patricia Bianco
*Assistant Examiner* — Camtu Nguyen
(74) *Attorney, Agent, or Firm* — Jensen & Puntigam, P.S.

(57) ABSTRACT

The motor includes a rigid anchor member which is fixedly mounted to the applicator housing, an electromagnetic stator member and an armature. The armature includes a permanent magnet assembly and two leaf springs which connect the anchor member and the armature, the leaf springs being positioned at right angles to each other. The ratio of the lengths of the spring members is within the range of 0.75:1 to 0.95:1. A driving assembly produces an alternating current drive signal to the stator member which moves the armature and a skin contact member attached thereto in a reciprocating motion which includes a first component perpendicular to the skin, a second component parallel to the skin and a third arcuate component.

29 Claims, 3 Drawing Sheets

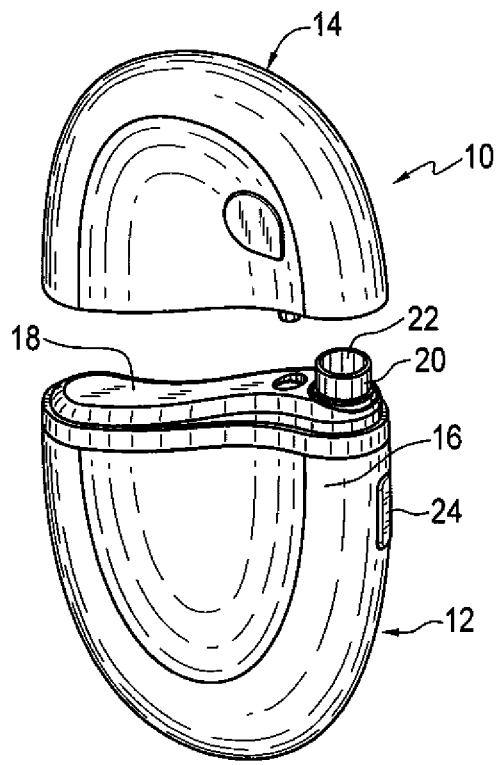
FIG. 1
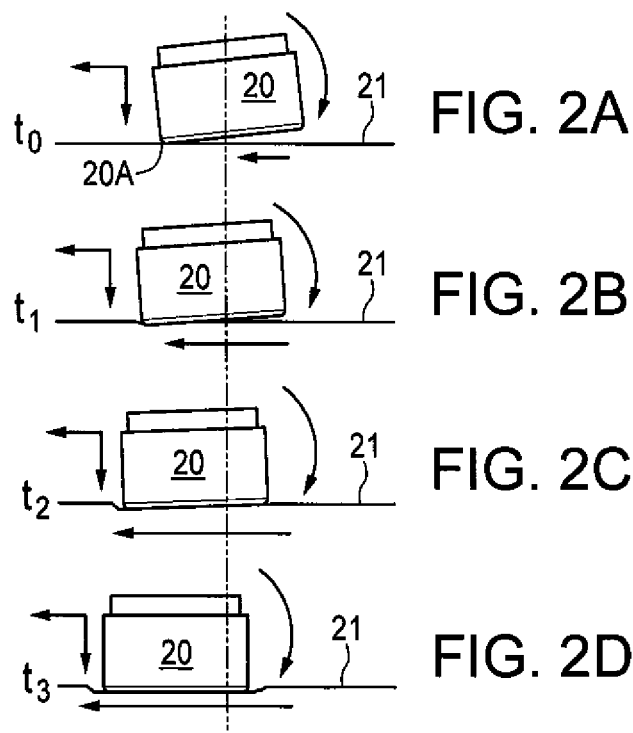
FIG. 2A
FIG. 2B
FIG. 2C
FIG. 2D

MOTOR FOR A PERSONAL SKIN CARE APPLIANCE

TECHNICAL FIELD

This invention relates generally to personal care appliances for applying skin formulations, typically to the facial skin area, which operate in the sonic frequency range, and more specifically concerns a motor for such an appliance.

BACKGROUND OF THE INVENTION

Power appliances for applying skin formulations to the facial area of a user are advantageous in maximizing the effect/absorption of the skin formulations. Such an appliance, along with several motor embodiments useful in the appliance, is described in U.S. patent application Ser. No. 12/135,887, which is owned by the assignee of the present invention. The contents of the '887 application are hereby incorporated by reference.

There are several factors which are important in such an appliance. First, it is important that the operation of the motor for the appliance be efficient. Many types of motors, while they may otherwise be effective in operation, have a low efficiency, due to friction and resulting drag. In other motors, design constraints to enable operation reduce efficiency. High motor efficiency is important to insure that the operation of the appliance is practical.

In addition to efficiency, it is important that the operation of the appliance be both effective, i.e. produce significant absorption of the skin formulation to improve skin appearance, and also be comfortable, i.e. that the physical contact between the applicator and the skin of the user be acceptable comfort-wise, so that there is no reluctance to use the appliance. Accordingly, it is desirable that a skin formulation appliance be both efficient in operation and produce improvement in the appearance of the user's skin.

SUMMARY OF THE INVENTION

Accordingly, one aspect of the invention is a motor for a personal skin care appliance, the appliance including an appliance housing, wherein the motor drives a skin contact member, the motor comprising: an anchor member fixedly mounted to the applicator housing; an electromagnetic stator member; an armature which includes a permanent magnet assembly and two spring members which connect the anchor member to the armature, the springs being mounted at right angles to each other, wherein the ratio of the lengths of the spring members is within the range of 0.75:1 to 0.95:1; and a driving assembly producing an alternating current drive signal for the stator member, resulting in the armature moving in opposing directions during successive half cycles of the drive signal, resulting in an oscillating motion of the skin contact member.

Another aspect of the invention is a personal skin care appliance, comprising: an appliance housing; a motor contained within the housing, having an applicator tip assembly which is moved in a reciprocating manner, wherein the applicator tip assembly includes a skin contact member, wherein the motor includes an anchor member fixedly mounted to the housing, an electromagnetic stator member; an armature which includes a permanent magnet assembly and two spring members which connect the anchor member to the armature, wherein the spring members are mounted substantially at a right angle to each other, and wherein the ratio of the lengths of the spring members is within the range of 0.75:1 to 0.95:1; and a driving assembly producing an alternating current drive signal for the stator to move the armature in opposing directions during successive half cycles of the drive signal, resulting in an oscillating motion of the skin contact member.

BRIEF DESCRIPTION OF THE DRAWINGS

FIG. 1 is a perspective view of the exterior of a personal skin care appliance using the motor described and shown herein, the appliance being shown with its cap portion removed.

FIGS. 2A-2D are a series of views showing the sequence and extent of contact between the applicator tip portion of the appliance and the facial skin of the user.

BEST MODE FOR CARRYING OUT THE INVENTION

Figure 3:
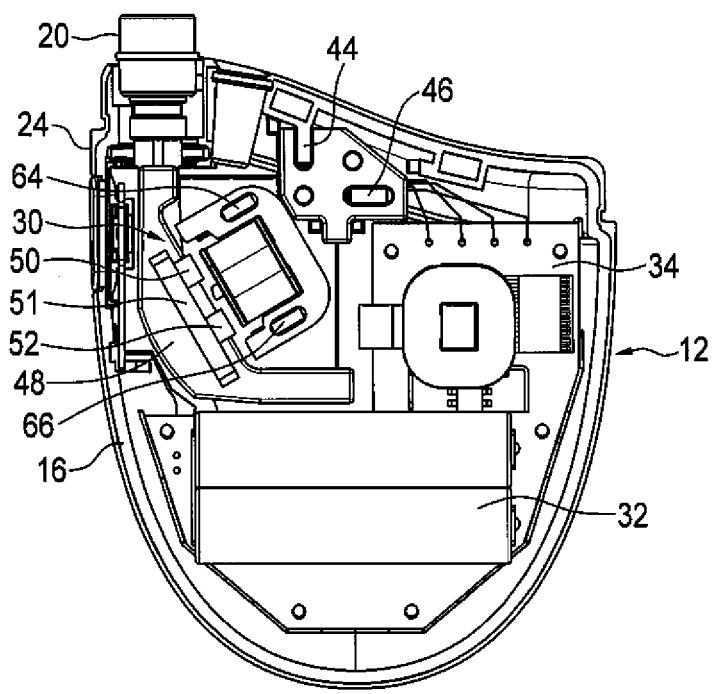
FIG. 3 is a cross-sectional diagram of the interior of the appliance showing the operating parts thereof.

FIG. 1 shows an applicator appliance, generally at 10, for applying a skin formulation to the facial area of a user. The appliance includes a body portion 12 and a removable cap portion 14. The body portion 12 includes a housing portion 16. Extending from the upper surface 18 of housing portion 16 is an applicator tip 20 which contacts the skin of the user. In the embodiment shown, applicator tip 20 includes a concave portion 22 at a forward end thereof. The concave portion will temporarily hold a selected quantity of a skin formulation which is to be applied to the user's facial skin area during operation of the appliance. The appliance is controlled by an on/off switch 24.

For effective operation of the appliance, specifically, operation which produces effective absorption of the skin formulation, with a comfortable contact between the applicator tip and the user's skin, a complex motion of the applicator tip 20 has been found to be important. A first component of the applicator tip motion is perpendicular to the surface of the skin, a second component of motion is parallel to the surface of the skin, and a third component is arcuate which results in progressively increasing contact between the applicator tip and the skin.

FIG. 2 shows a sequence of this desired motion. At a time $t_0$ (FIG. 2A), initial contact between applicator tip 20 and skin area 21 is shown. The inside edge 20A of the applicator tip 20 comes first into contact with the surface of the skin 21. Force is beginning to be applied downwardly, perpendicular to the surface of the skin, producing an initial amount of compressive force on the skin. Initial tensile stress is also produced on the skin 21. At time $t_1$ (FIG. 2B), applicator tip 20 is rotating clockwise as well as moving downwardly perpendicular to and against the skin, continuing to compress the skin, as shown. In addition, the applicator tip moves to the left, parallel to the surface of the skin 21. This parallel motion component produces a sufficient but relatively small tensile stress in the skin, which when combined with the compressive force has been discovered to be important in improving absorption of skin formulations but without damaging the skin or causing discomfort.

The applicator tip motion changes at time $t_2$ (FIG. 2C), and again at time $t_3$ (FIG. 2D), at which point the contacting surface of the applicator tip is essentially parallel to the surface of the skin 21 with the contacting surface of the applicator tip in full contact with the skin, and with both the compressive force perpendicular to the skin and the tensile stress parallel to the surface of the skin reaching a maximum value. The applicator tip produces a compressive force against the skin along the entire contacting surface of the applicator tip, as shown in FIG. 2D. The motion of the applicator tip then is reversed by motor action, with the applicator tip ending up at its initial position. The sequence 2A-2D is then repeated, at a selected frequency.

It has been discovered that the progressively increasing contact between the surface of the skin due to the arcuate component of the applicator tip motion is important in maintaining a comfortable contact, i.e. sensation, in the user. The above described motion, while complex, has the dual advantage of producing effective absorption of the skin formulation as well as maintaining a satisfactory comfortable level of contact for the user, such that the average user will continue to use the applicator. The complex motion, combined with the concave shape of the forward surface of the applicator tip, helps to keep the quantity of skin formulation present in the concave portion from being immediately displaced from the area of application on the user's skin.

FIG. 3 is a cross-sectional diagram showing the overall operating parts contained within the appliance body 12. The appliance body 12 includes a motor referred to generally at 30, which will be described in more detail below, and a source of power, which in the embodiment shown are rechargeable batteries 32, but which could be other power sources as well, such as primary cells or an external power supply. The control signal to the motor, as well as other operational control functions, such as sensing the state of the on/off switch 24, controlling the duration of a single application use and monitoring battery charge state are provided by a microprocessor 34. Microprocessor 34 is conventional in structure and operation for such an appliance. All of the above parts are contained within housing portion 16 of body 12 of the appliance.

Figure 4:
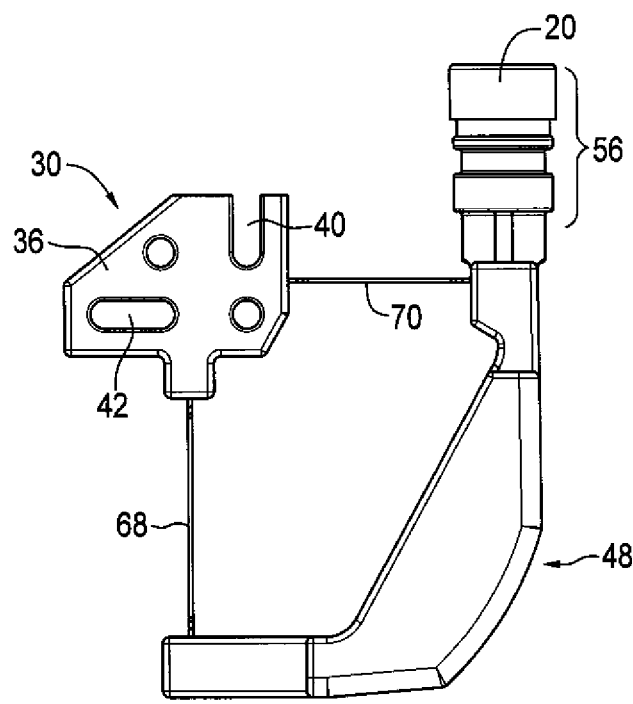
FIG. 4 is a top view showing a general layout of a portion of the motor shown and described herein in a reverse orientation relative to FIG. 3.
Figure 5:
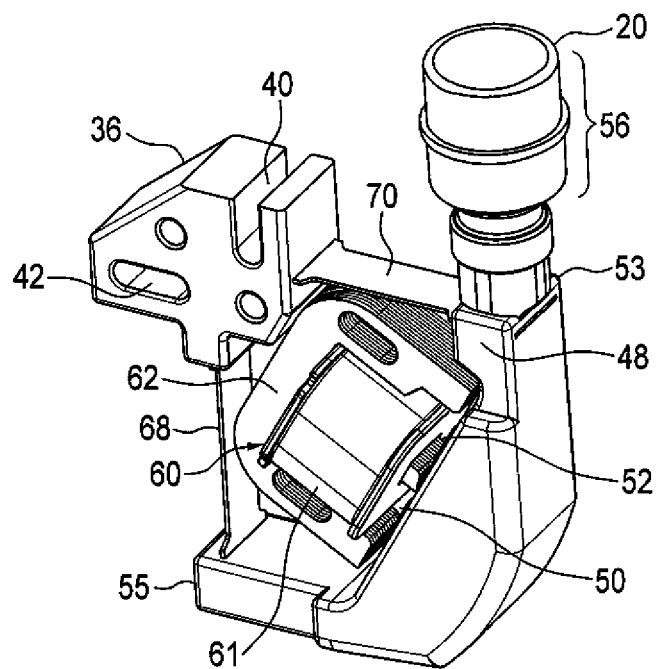
FIG. 5 is a perspective view showing the motor with the applicator tip assembly.
Figure 6:
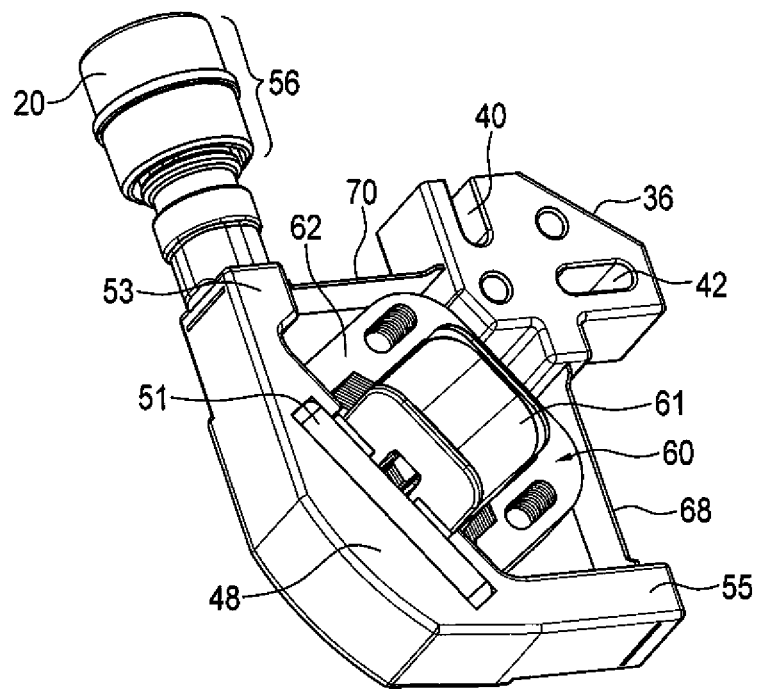
FIG. 6 is a perspective view of the motor from the opposite side of FIG. 5.

FIGS. 4-6 show the motor 30 for the appliance in more detail. The motor includes an anchor member 36 which is made from a stiff material which, in the embodiment shown, is hard plastic. The anchor member in the embodiment shown includes two slots 40 and 42 which are at right angles to each other, and which fit securely into corresponding rib elements 44 and 46 which are part of the housing portion 16 (FIG. 3). The anchor member 36 is thus fixed in position in the housing and is not free to move during operation of the motor.

Motor 30 also includes an armature assembly 48 which includes two spaced permanent magnets 50 and 52 mounted on a metal backiron 51 (FIGS. 3, 6). In the embodiment shown, the permanent magnets are spaced approximately 0.18 inches apart, but this can be varied. Further, the permanent magnets, in the embodiment shown, are 0.15 inches square by 0.1 inches thick, although these dimensions can also vary.

At one end 53 of the armature member 48 is a removable applicator tip assembly 56, at the forward end of which is positioned applicator tip 20. The applicator tip 20 is described in more detail in co-pending U.S. patent application Ser. No. 12/474,426, owned by the assignee of the present invention, the contents of which are hereby incorporated by reference. The applicator tip has a concave forward surface, to hold the skin formulation and is made from a very soft material, Shore scale OO Durometer 30. The flexibility of the material is similar to that of human skin and thus transmits motion and force efficiently.

Positioned between anchor member 36 and armature 48 is an electromagnetic stator assembly 60. The electromagnetic stator assembly 60 includes a conventional electromagnet 61 and an E-core laminated stack 62, the outer legs of which are separated from the center leg by 0.257 inches and 0.267 inches, respectively, in the embodiment shown. The stator poles are the ends of the three legs. The stator assembly is mounted to two opposing ribs 64 and 66 which are also part of housing portion 16. Hence, in operation of the motor the stator assembly 60 also remains fixed in position.

The motor further includes two leaf springs 68 and 70 which extend between and connect anchor member 36 and opposing extending end portions 53 and 55 of armature 48. The extending end portions of armature 48 are at right angles to each other. In the embodiment shown, the leaf springs are approximately 0.2 inches wide and 0.012 inches thick and are made of stainless steel. The leaf springs 68 and 70 also extend approximately at right angles to each other. Leaf springs 68 and 70 have different free lengths. The ratio of the free lengths of the leaf springs is important to achieve the desired multi-component motion of the applicator tip to produce effective and comfortable application of skin formulations. The ratio of the length of spring 70 to the length of spring 68 is within the range of 0.75:1 to 0.95:1. A preferred free length ratio is within the range of 0.79:1 to 0.83:1. When the appliance is properly oriented relative to the skin, leaf spring 68 will be approximately perpendicular to the skin, while leaf spring 70 will be approximately parallel with the skin. It is this arrangement of leaf springs which produces the desired combination of effective absorption of skin formulation and comfort to the user.

In operation, following actuation of the on/off switch, an alternating current electrical signal from microprocessor 34 is provided to the electromagnetic stator assembly 60. During one half cycle of the alternating current signal, the two outer poles of the electromagnet will attract one of the permanent magnets and repel the other permanent magnet. The center pole will also repel one permanent magnet while attracting the other. The resulting force moves armature 48, including the applicator tip, in a complex slightly arcuate motion counterclockwise (as viewed in FIG. 5) relative to the stator assembly 60 and toward the skin. This motion, as indicated above, and as shown in FIG. 2A-2D, includes a component of perpendicular motion, a component of parallel motion and a small component of arcuate motion. On the other half cycle, the direction of the current is reversed, and the armature responds by moving the tip applicator away from the skin in a clockwise direction relative to the stator.

The frequency of the action is typically within a range of 50-200 Hz, and preferably in the range of 110-135 Hz. The range of amplitude of the motion perpendicular to the surface of the skin is within the range of 0.01 inches to 0.075 inches, and preferably from 0.02 inches to 0.035 inches. The range of motion parallel to the surface of the skin is within the range of 0.005 inches to 0.07 inches with a preferred range of 0.013 inches to 0.032 inches. The arcuate motion that results from these dimensions is relatively small, following an arc in the range of 0.5°-3°, preferably approximately 2°, although this value will vary with the actual dimensions used.

In operation, leaf springs 68 and 70 act to both center the armature when it is at rest and to produce a mechanically resonant system when combined with the mass of the moving armature and the applicator tip assembly. When the electrical current alternates direction at a frequency roughly equal to the mechanical resonance of the overall system, the amplitude of motion of the armature structure increases significantly, thus producing the required motion for effective action with the desired high efficiency relative to the electrical power input. Hence, the appliance is both effective in producing rapid and effective absorption of the skin formulation, but also is a practical appliance to operate.

Although a preferred embodiment has been disclosed for purposes of illustration, it should be understood that various changes and modifications and substitutions could be made in the preferred embodiment without departing from the spirit of the invention as defined by the claims which follow:

1. A motor for a personal skin care appliance, the appliance including an appliance housing, wherein the motor drives a skin contact member, the motor comprising:
   an anchor member fixedly mounted to the applicator housing;
   an electromagnetic stator member;
   an armature which includes a permanent magnet assembly and two independent spring members which do not contact each other and which connect the anchor member to the armature, the spring members being mounted at right angles to each other, wherein the ratio of the lengths of the spring members is within the range of 0.75:1 to 0.95:1; and
   a driving assembly producing an alternating current drive signal for the stator member, resulting in the armature moving in opposing directions during successive half cycles of the drive signal, resulting in an oscillating motion of the skin contact member.

2. The motor of claim 1, wherein said ratio is within a range of 0.79:1 to 0.83:1.

3. The motor of claim 1 wherein the spring members are leaf springs.

4. The motor of claim 1, wherein the respective ends of each leaf spring are constrained by the anchor member and opposing ends of the armature, respectively.

5. The motor of claim 1, wherein the armature is positioned generally diagonally from the anchor member.

6. The motor of claim 1, wherein the action of the motor produces a motion of the skin contact member, the motion having a first component perpendicular to the skin, a second component parallel to the skin, and a third arcuate component.

7. The motor of claim 6, wherein the frequency of motion is within the range of 50-200 Hz.

8. The motor of claim 7, wherein frequency is within the range of 110-135 Hz.

9. The motor of claim 6, wherein the arcuate motion is along an arc in the range of .5°-3°.

10. The motor of claim 9, wherein the arc is approximately 2°.

11. The motor of claim 6, wherein the movement of the skin contact member perpendicular to the skin is within the range of 0.01 to 0.075 inches and the range of movement parallel to the surface of the skin is within the range of 0.005 to 0.07 inches.

12. The motor of claim 6, wherein the range of movement of the skin contact member perpendicular to the skin is within the range of 0.02 inches to 0.035 inches and the range of movement parallel to the skin is within the range of 0.013 inches to 0.032 inches.

13. The motor of claim 1, wherein the stator member is located within the area bounded by the anchor member, the spring members and the armature member, the stator member being fixed to the applicator housing.

14. The motor of claim 1, wherein the anchor member comprises a rigid material.

15. The motor of claim 1, wherein the personal skin care appliance is an applicator for applying skin formulations to the facial area of a human user.

16. A personal skin care appliance, comprising:
   an appliance housing;
   a motor contained within the housing, having an applicator tip assembly which is moved in a reciprocating manner, wherein the applicator tip assembly includes a skin contact member, wherein the motor includes an anchor member fixedly mounted to the housing; an electromagnetic stator member; an armature which includes a permanent magnet assembly and two independent spring members which do not contact each other and which connect the anchor member to the armature, wherein the applicator tip assembly is positioned at one end of the armature, wherein the spring members are mounted substantially at a right angle to each other, and wherein the ratio of the lengths of the spring members is within the range of 0.75:1 to 0.95:1; and
   a driving assembly producing an alternating current drive signal for the stator to move the armature in opposing directions during successive half cycles of the drive signal, resulting in an oscillating motion of the skin contact member.

17. The appliance of claim 16, wherein said ratio is within the range of 0.79:1 to 0.83:1.

18. The appliance of claim 16, wherein the respective ends of each spring member are constrained by the anchor member and opposing ends of the armature, respectively.

19. The appliance of claim 16, wherein the action of the motor produces a motion of the skin contact member, the motion having a first component perpendicular to the skin, a second component parallel to the skin, and a third arcuate component.

20. The appliance of claim 19, wherein the frequency of motion is within the range of 50-200 Hz.

21. The appliance of claim 20, wherein the frequency is within the range of 110-135 Hz.

22. The appliance of claim 20, wherein the arc is approximately 2°.

23. The appliance of claim 19, wherein the appliance is an applicator for applying skin formulations to the facial area of a human user.

24. The appliance of claim 23, wherein the movement of the skin contact member perpendicular to the skin is within the range of 0.02 inches to 0.35 inches, wherein the movement of the skin contact member parallel to the skin is within the range of 0.013 inches to 0.032 inches and wherein the arcuate motion is approximately 2° and wherein the frequency is within the range of 110-135 Hz.

25. The appliance of claim 19, wherein the movement of the skin contact member perpendicular to the skin is within the range of 0.01 to 0.075 inches and the range of movement parallel to the surface of the skin is within the range of 0.005 to 0.07 inches.

26. The appliance of claim 19, wherein the range of movement of the skin contact member perpendicular to the skin is within the range of 0.02 inches to 0.035 inches and the range of movement parallel to the skin is within the range of 0.013 inches to 0.032 inches.

27. The appliance of claim 19, wherein the arcuate motor is along an arc in the range of .5°-3°.

28. The appliance of claim 16, wherein the skin contact member has a cupped concave central area at a forward end thereof for receiving the skin formulations.

29. The appliance of claim 28, wherein the skin contact member comprises a material Shore scale OO Durometer 30.

* * * * *